Jan. 21, 1941.　　　　B. DICK　　　　2,229,054
LUBRICATION APPARATUS
Filed Aug. 1, 1938
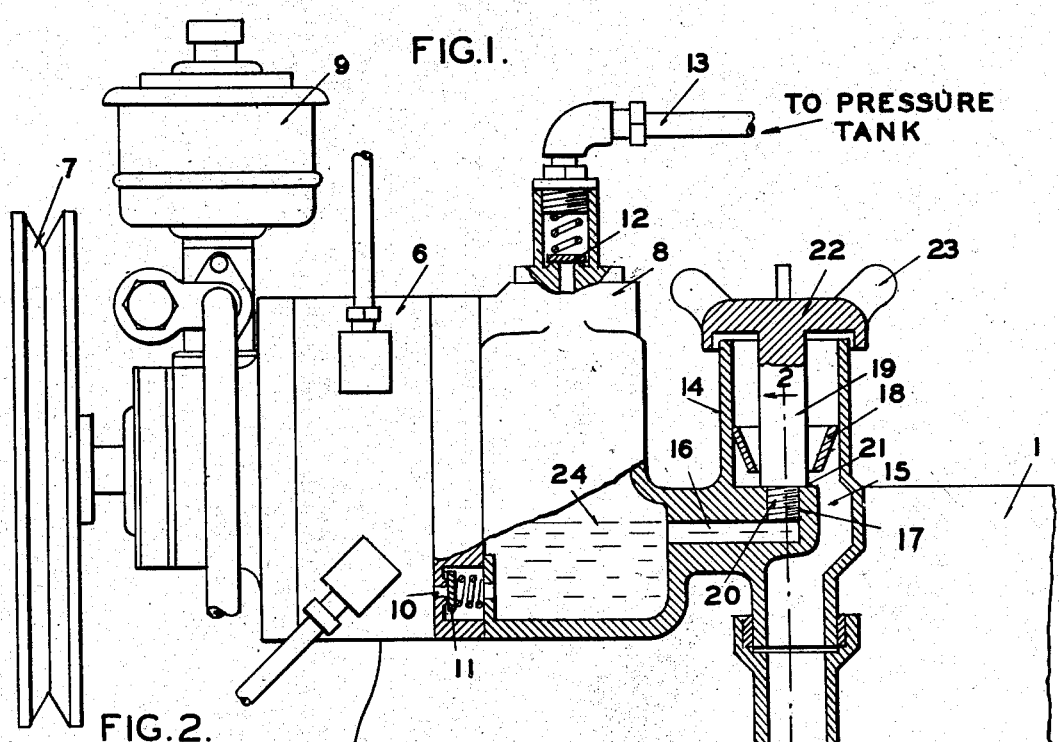
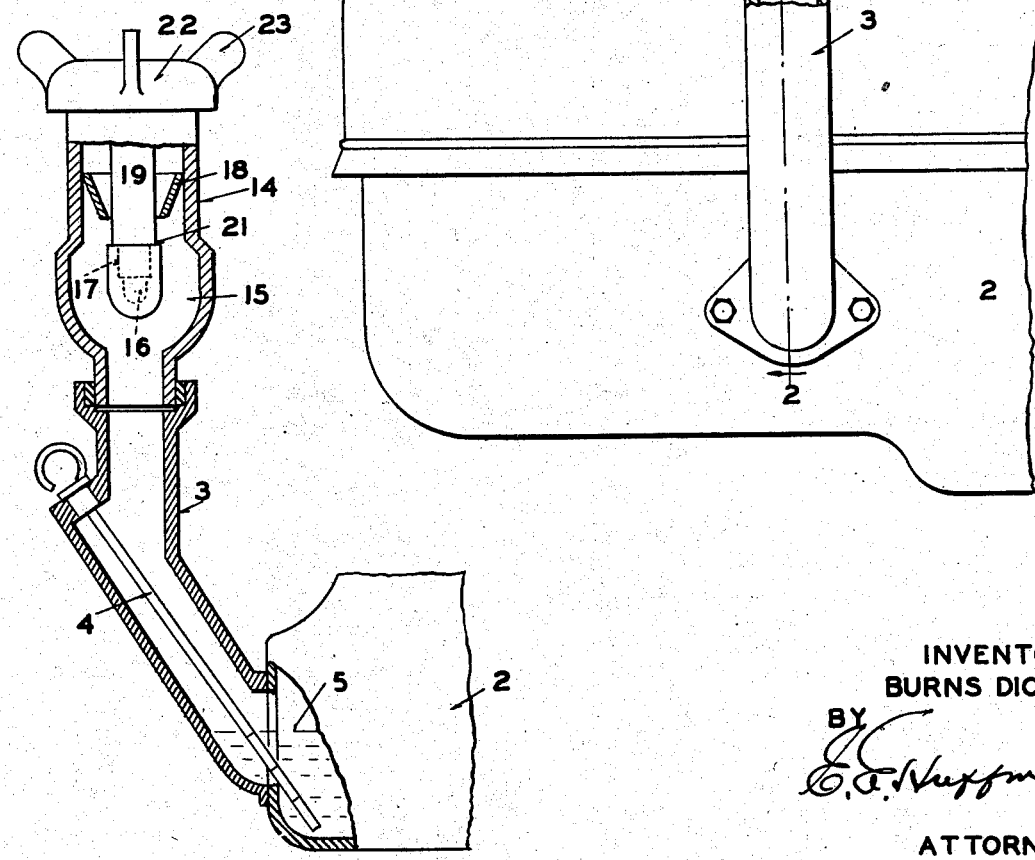
INVENTOR
BURNS DICK
BY
ATTORNEY Patented Jan. 21, 1941

2,229,054

UNITED STATES PATENT OFFICE 2,229,054

LUBRICATION APPARATUS

Burns Dick, Ferguson, Mo., assignor to Wagner Electric Corporation, St. Louis, Mo., a corporation of Delaware Application August 1, 1938, Serial No. 222,390

7 Claims. (Cl. 184—105)

My invention relates to lubrication apparatus and more particularly to means for insuring that certain apparatus will at all times be furnished with the proper amount of lubrication.

One of the objects of my invention is to provide means for insuring that an accessory associated with an engine will be properly filled with lubricant each time the engine is replenished with the lubricant.

Another object of my invention is to so associate the lubricant filler opening of an oil dome of a compressor with the lubricant filler conduit on an engine that the oil dome will be filled with lubricant each time lubricant is placed in the engine.

Other objects of my invention will become apparent from the following description taken in connection with the accompanying drawing in which Figure 1 is a view, partly in section, of a compressor and an oil filler conduit of an engine showing structure associated therewith and embodying my invention; and Figure 2 is a cross-sectional view taken on the line 2—2 of Figure 1.

Referring to the figures in detail, numeral 1 indicates an internal combustion engine having a crank-case 2 for containing lubricant in the form of oil for lubricating the moving parts of the engine in a well-known manner. The crank-case is provided with a filled conduit 3 and associated therewith is the usual dip stick 4 to determine the level 5 of the oil in the crank-case.

The engine in the particular embodiment shown has mounted thereon a rotary compressor 6 of well-known construction, the rotor (not shown) of which is belt driven from the engine by the pulley 7. The compressor has associated therewith an oil dome 8 for carrying the oil for lubricating the rotor and other moving parts of the compressor. Air is admitted to the inlet of the compressor through the air cleaner 9 and after being compressed is forced into the oil dome through the outlet 10 provided with a check valve 11. From the oil dome the compressed air can pass through the check valve 12 and into conduit 13 leading to the pressure tank where it may be used to operate any device desirable.

The oil in the oil dome should always be maintained at or near a certain level in order to insure that the compressor will be properly lubricated. It is very common for vehicle operators to neglect to check the oil dome oil or to add oil when needed. Thus if no special means not requiring special attention by the vehicle operator is employed to insure that the oil dome level will be kept at the proper height, it may readily happen that the oil in the oil dome will become exhausted or nearly so, thereby causing damage to the compressor.

In accordance with my invention, the filler opening for the oil dome is so associated with the conduit for filling the engine crank-case that the oil level in the oil dome will be brought up to the proper level each time oil is poured into the crank-case. In the construction shown the oil dome 8 is provided with an integral portion 14 fitted onto the filler conduit 3 and having a vertical passage 15 communicating with said filler conduit. The portion 14 is also provided with a horizontal passage 16 communicating with the oil dome at the proper oil level for the oil in said dome and having a mouth 17 for placing the passage 16 in communication with passage 15. The mouth 17 is threaded and positioned at the top of a ledge extending into passage 15. Within the passage 15 and spaced above the mouth 17 is a funnel member 18 for directing oil into the mouth and passage 16. The passage 16 is adapted to be closed fluid-tight by a plug 19 having a threaded end 20 for cooperation with the threaded mouth and a shoulder 21 for fluid-tight sealing engagement with the portion of the surface of the ledge surrounding the mouth. The plug 19 carries a cap 22 for covering the upper open end of passage 15, this cap being spaced slightly from the end of the passage when the plug is in position to close passage 16 in order that air may freely pass in and out of the crank-case. The cap is provided with finger projections 23 for screwing up and unscrewing the plug.

In operation, whenever oil is placed in the crank-case, the cap must be removed which also requires that the plug 19 be removed to thereby open passage 16. The first oil that is now poured into passage 15 will be directed into mouth 17 by the funnel member 18 and thus pass into the oil dome through passage 16. When the level of the oil in the dome reaches the height of passage 16 as indicated at 24, no more oil will enter the dome and the remainder will flow down the passage 15 and conduit 3 into the crank-case. When the cap is replaced and plug 19 screwed up, the dome will again be sealed fluid-tight to hold the compressed air.

It is thus seen that each time oil is poured into the crank-case, the oil level in the compressor oil dome will again be brought to the proper level if it is below this level. Thus there is no danger of the vehicle operator forgetting to add oil to the compressor and thereby causing damage thereto. Since the engine oil is checked periodically and the compressor does not use an excessive amount of oil, there will be no danger of the compressor having insufficient lubricant.

Being fully aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a chamber for containing lubricant, a mechanism having moving parts, a lubricant containing chamber associated with the mechanism for furnishing lubricant thereto, a conduit leading to the first named chamber, a conduit having one end communicating with the second named chamber and its other end so communicating with the first named conduit at a point below the point where lubricant enters said conduit when being supplied to the first chamber that at least a portion of the lubricant will flow into the end of the second conduit and be conducted to the second chamber, a cover for the open end of the first conduit, and means secured to the cover and extending into the first conduit for closing the second conduit, said means supporting the cover in spaced relation to the open end of the first conduit.

2. In combination, an engine having a crank-case, a conduit for conducting oil to the crank-case, a mechanism mounted adjacent the engine and having an oil reservoir containing oil under a relative high pressure when the mechanism is operating, a conduit communicating with the oil reservoir and having an end opening upwardly and so positioned in the crank-case conduit below the point where oil enters said conduit when being supplied to the crank-case that at least a portion of the oil will enter the open end of the reservoir conduit and be conducted to the reservoir, and removable means extending into the crank-case conduit and secure to the reservoir conduit for preventing fluid under pressure in the oil reservoir from being forced out through said latter conduit.

3. In combination, an engine having a crank-case, a conduit for conducting oil to the crank-case, a compressor mounted adjacent the engine and having an oil dome in which there is a relatively high fluid pressure, a conduit communicating with the oil dome and having an end so positioned in the crank-case conduit at a point below the mouth thereof that a portion of the oil poured into the crank-case conduit will enter the conduit communicating with the oil dome, a cover for the crank-case conduit, and means secured to the cover and extending into the crank-case conduit for sealing the oil dome conduit against leakage of said fluid pressure, said cover being supported by said means in spaced relation from the mouth of the crank-case conduit.

4. In combination, an engine having a crank-case, a conduit for conducting oil to the crank-case, a mechanism mounted adjacent the engine and having an oil receiving chamber, a horizontal conduit communicating with the chamber and having a threaded open end so associated with the crank-case conduit at a point below the mouth thereof that a portion of the oil poured into the crank case conduit will flow into and through the chamber conduit and fill said chamber to the height of the conduit, and a threaded plug cooperating with the threaded open end for producing a fluid-tight seal for the oil dome conduit, said plug having a portion extending above the mouth of the crank-case conduit adapted to be grasped by the hand to turn the plug.

5. In combination, an engine having a crank-case, a conduit for conducting oil to the crank-case, a compressor mounted adjacent the engine and having an oil dome, a conduit communicating with the oil dome and having a mouth positioned in the crank-case conduit below the mouth of the latter and opening upwardly, and a funnel associated with the crank-case conduit and positioned above the mouth of the oil dome conduit for guiding all the oil poured into the crank-case conduit toward said mouth.

6. In combination, an engine having a crank-case, a conduit for conducting oil to the crank-case, a compressor mounted adjacent the engine and having an oil dome, a conduit communicating with the oil dome and having a mouth positioned in the crank-case conduit and opening upwardly, a funnel associated with the crank-case conduit above the mouth of the oil dome conduit for guiding oil into said mouth, a cover for the crank-case conduit, and a member secured to the cover and cooperating with said mouth of the oil dome conduit for closing it fluid-tight, said cover being supported by said member and spaced from the top of the crank-case conduit when the member is in closed position.

7. In combination, an engine having a crank-case, a pipe for conducting oil to the crank-case, a compressor mounted adjacent the engine and having an oil dome, a member carried by the oil dome and having a vertical passage therethrough adapted to be connected to the top of the crank-case pipe, said member being formed with an integral projection extending laterally into the passage at a point below the upper end thereof, means forming a passage in said member and communicating with the oil dome and with the vertical passage at the top of said projection, and means for closing the oil dome passage.

BURNS DICK.